Patented Oct. 3, 1933

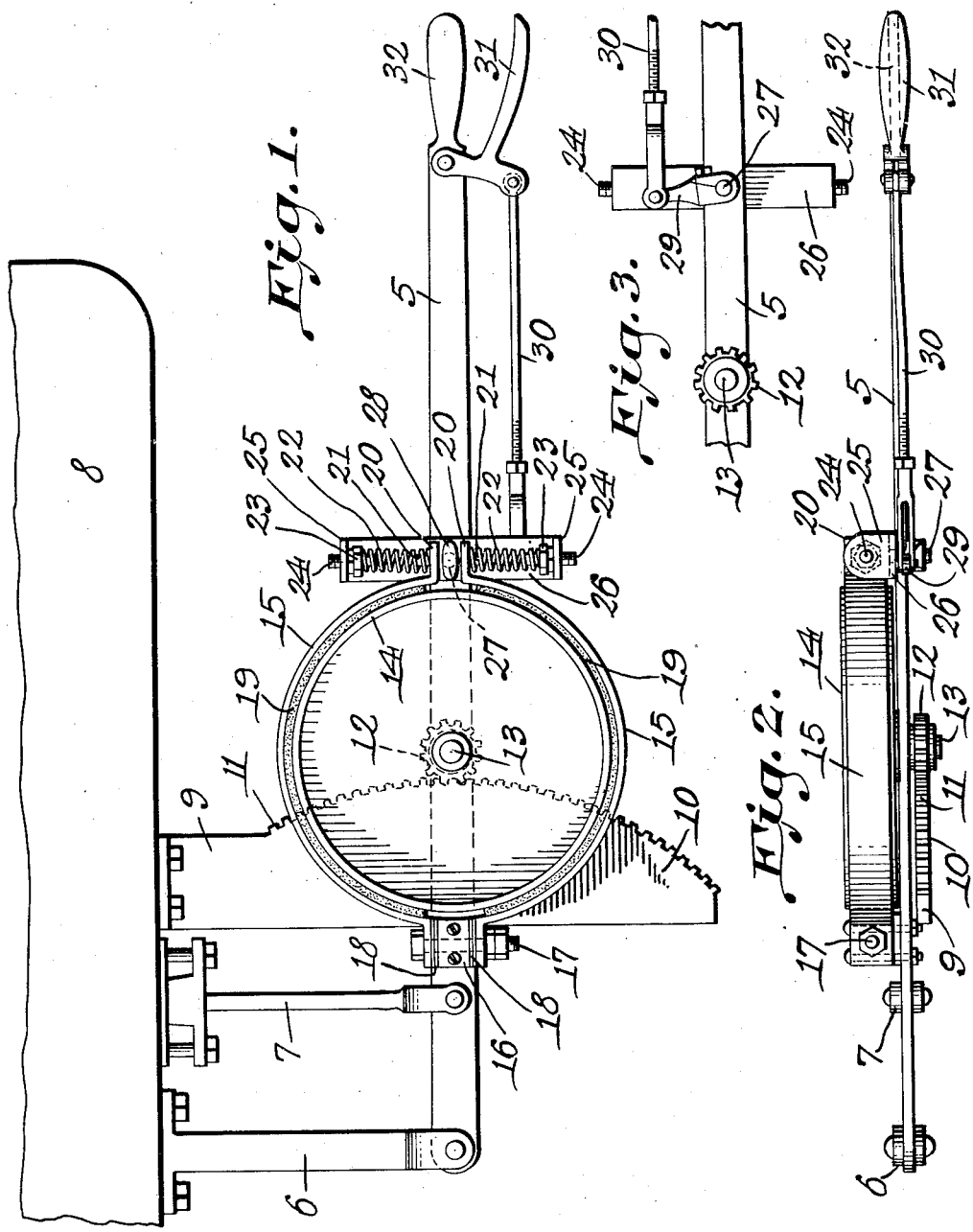

1,928,855

UNITED STATES PATENT OFFICE 1,928,855

THROTTLE BRAKE

Walter T. Hamlin, Monahans, Tex.

Application August 15, 1932. Serial No. 628,945

1 Claim. (Cl. 74—39)

This invention relates to throttle levers designed primarily for use in connection with locomotives and steam engines of various types, the primary object of the invention being to provide means for securing the throttle lever in a set position against accidental displacement.

Another object of the invention is to provide a device of this character wherein the lining of the brake or securing device, may be readily and easily removed and replaced when the same becomes worn or otherwise rendered inoperative.

A still further object of the invention is to construct a throttle lever brake in such a manner that the bands carrying the brake lining may be readily adjusted to compensate for wear of the brake lining.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a throttle lever equipped with a brake constructed in accordance with the invention.

Figure 2 is a plan view thereof.

Figure 3 is a fragmental rear elevational view of the brake band actuating lever.

Referring to the drawing in detail, the reference character 5 designates the throttle lever of a locomotive, which is pivotally mounted on the arm 6, in the usual and well known manner.

The reference character 7 designates the throttle that is actuated by the throttle lever 5 for controlling the speed and operation of the locomotive. Supported on the locomotive boiler, which is indicated by the reference character 8, is an arm 9, which arm is formed with an enlargement 10, one edge thereof being formed with teeth 11 that mesh with the pinion 12, mounted on one end of the shaft 13, that is mounted in an opening or bearing formed in the throttle lever 5. Secured to the opposite end of shaft 16, is a drum 14 forming a part of the securing device or brake.

Cooperating with the drum 14, are the brake bands 15 that have one of their respective ends secured to the block 16 that is mounted on the throttle lever 5, the brake bands being held in position by means of the bolt 17 that passes therethrough.

Positioned between the brake bands and block 16, are shims 18, which may be readily removed or replaced in order to adjust the brake bands 15 towards and away from the brake drum 14. Suitable brake linings 19 are carried by the brake bands, and normally grip the drum 14, to insure against movement of the throttle lever 5, when the throttle lever has been set in a predetermined position.

The forward ends of the brake bands 15 are extended at right angles as at 20, and are provided with pins 21 that extend therefrom, the pins providing seats for the inner ends of the coiled springs 22, which coiled springs have their opposite ends positioned against the adjusting nuts 23 that operate on the threaded bolts 24 which pass through the right angled ends 25 of the bar 26, this bar 26 is secured to the throttle levers at a point adjacent to the brake drum, as clearly shown by Figure 1 of the drawing.

Extending through the throttle lever 5, is a shaft 27, which shaft is supplied with a transversely elongated head 28 positioned between the right angled end portion 20, and disposed in such a way that rotary movement of the shaft will move the head into engagement with the right angled end portions 20 spreading them apart against the action of the springs 22, and consequently moving the brake bands 15 out of engagement with the brake drum 14, releasing the throttle lever to permit the throttle lever to be adjusted properly.

Secured to the shaft 27 is an arm 29 to which the rod 30 is connected, the rod 30 being also connected to the hand lever 31 disposed adjacent to the handle 32, so that the operator may grip the rod 30, lever and handle rotating the shaft 27 and head.

It is obvious that when the hand lever 31 is released, the springs will act to move the brake bands to their normal or gripping positions, securing the lever against movement.

In view of the foregoing detailed description, it is believed that a further description of the device is unnecessary.

Having thus described the invention what is claimed is:

The combination with a throttle lever and a stationary member having a curved edge formed with teeth, mounted adjacent to the lever, of a throttle lever brake comprising a shaft mounted on the lever, a pinion on one end of the shaft and cooperating with the teeth of the stationary member, a brake drum on the opposite end of the shaft and movable with the shaft, a brake band surrounding the brake drum and having right angled end portions, a bar mounted on the lever and having right angled end portions disposed opposite to the right angled end portions of the brake band, coiled springs mounted between the right angled end portions of the bar and band, normally urging the brake band into engagement with the brake drum, and means disposed between the right angled ends of the brake band, for spreading the brake band and moving the brake band to its inactive position.

WALTER T. HAMLIN.